(12) United States Patent
Ueda et al.

(10) Patent No.: US 12,105,059 B2
(45) Date of Patent: Oct. 1, 2024

(54) MATERIAL TEST MACHINE AND METHOD FOR CONTROLLING MATERIAL TEST MACHINE

(71) Applicant: SHIMADZU CORPORATION, Kyoto (JP)

(72) Inventors: Shunichi Ueda, Kyoto (JP); Keisuke Horie, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 746 days.

(21) Appl. No.: 17/153,843

(22) Filed: Jan. 20, 2021

(65) Prior Publication Data

US 2021/0231545 A1    Jul. 29, 2021

(30) Foreign Application Priority Data

Jan. 24, 2020  (JP) .................................. 2020-009667

(51) Int. Cl.
| | | |
|---|---|---|
| *G01N 3/08* | (2006.01) | |
| *G01N 3/06* | (2006.01) | |
| *G06F 3/14* | (2006.01) | |
| *G06T 11/20* | (2006.01) | |

(52) U.S. Cl.
CPC ................ G01N 3/08 (2013.01); G01N 3/06 (2013.01); G06T 11/206 (2013.01); *G01N 2203/0017* (2013.01); *G01N 2203/0075* (2013.01); *G01N 2203/0202* (2013.01); *G06F 3/14* (2013.01)

(58) Field of Classification Search
CPC .... G01N 3/08; G01N 3/06; G01N 2203/0017; G01N 2203/0075; G01N 2203/067; G01N 2203/0202; G06T 11/206; G06F 3/14; G05B 19/0423
See application file for complete search history.

(56) References Cited

U.S. PATENT DOCUMENTS

| | | | |
|---|---|---|---|
| 3,916,673 A | 11/1975 | Gass et al. | |
| 7,387,031 B1* | 6/2008 | Perrin | G01N 3/567 |
| | | | 73/820 |
| 2002/0077795 A1 | 6/2002 | Woods et al. | |
| 2003/0188585 A1* | 10/2003 | Esser | G01N 3/38 |
| | | | 73/826 |

(Continued)

FOREIGN PATENT DOCUMENTS

| | | |
|---|---|---|
| CN | 101949797 | 5/2012 |
| CN | 108011135 | 5/2018 |

(Continued)

OTHER PUBLICATIONS

"Search Report of Europe Counterpart Application", issued on Jun. 1, 2021, p. 1-p. 8.

(Continued)

*Primary Examiner* — Jonathan M Dunlap
(74) *Attorney, Agent, or Firm* — JCIPRNET

(57) ABSTRACT

A tensile test machine is a tensile test machine that executes a tensile test by applying a test force to a test target to deform the test target and includes a detection unit that detects an elongation amount of the test target, a calculation unit that calculates an elongation rate of the test target on the basis of a detection result of the detection unit, and a display control unit that displays a graph showing a change in the elongation rate.

8 Claims, 4 Drawing Sheets

(56) References Cited

U.S. PATENT DOCUMENTS

| | | | |
|---|---|---|---|
| 2010/0299112 A1 | 11/2010 | Goldberg et al. | |
| 2012/0255500 A1* | 10/2012 | Dixon | A61B 5/4827 |
| | | | 73/862.626 |
| 2012/0287248 A1* | 11/2012 | Erdman, III | G01N 3/068 |
| | | | 348/47 |
| 2013/0055823 A1 | 3/2013 | Kawano | |
| 2018/0217039 A1 | 8/2018 | Hong et al. | |
| 2018/0372602 A1* | 12/2018 | Tsuji | G01N 3/08 |
| 2019/0234847 A1* | 8/2019 | Matsuura | G01N 3/066 |

FOREIGN PATENT DOCUMENTS

| | | | |
|---|---|---|---|
| CN | 207502303 | 6/2018 | |
| JP | H05232002 | 9/1993 | |
| JP | 2004125555 | 4/2004 | |
| JP | 2008298429 | 12/2008 | |
| JP | 2009214163 A * | 9/2009 | |
| JP | 2015087153 | 5/2015 | |
| JP | 2019052997 | 4/2019 | |
| WO | 9740359 | 10/1997 | |
| WO | WO-2008081505 A1 * | 7/2008 | G01N 3/06 |

OTHER PUBLICATIONS

"Office Action of Europe Counterpart Application, Application No. 21152986.2", issued on Sep. 9, 2022, p. 1-p. 10.

Office Action of Japan Counterpart Application, with English translation thereof, issued on Mar. 28, 2023, pp. 1-7.

Office Action of Japan Counterpart Application, with English translation thereof, issued on Oct. 3, 2023, pp. 1-7.

Office Action of China Counterpart Application, with English translation thereof, issued on Nov. 13, 2023, pp. 1-16.

"Office Action of China Counterpart Application", issued on Jun. 28, 2024, with English translation thereof, p. 1-p. 12.

* cited by examiner

MATERIAL TEST MACHINE AND METHOD FOR CONTROLLING MATERIAL TEST MACHINE

INCORPORATION BY REFERENCE

The present application claims priority under 35 U.S.C. § 119 to Japanese Patent Application No. 2020-009667 filed on Jan. 24, 2020. The content of the application is incorporated herein by reference in its entirety.

BACKGROUND

Technical Field

The present invention relates to a material test machine and a method for controlling the material test machine.

Related Art

In material test machines, various techniques related to strain rate control are known.

For example, a control unit of a tensile test machine described in JP 2015-87153 A includes an operation control switching unit for switching the operation control of a load mechanism from stroke rate control to strain rate control based on the amount of change in test force. This control unit is connected to a pressure sensor, a stroke detector, a displacement meter, a display meter, an operation unit, and a touch panel. The control unit is also connected to an electric servo valve and a hydraulic pump in a hydraulic unit. According to the tensile test machine described in JP 2015-87153 A, a tensile test by strain rate control can be executed.

However, in the tensile test machine described in JP 2015-87153 A, there is room for improvement in confirming the progress of a tensile test by strain rate control. For example, when the tensile test machine applies a test force until a test piece breaks, it was difficult for a worker to confirm the progress of the tensile test in order to ensure the safety of the worker when the test piece breaks.

The present invention has been made in view of such circumstances, and the present invention is to provide a material test machine capable of easily confirming the progress of a material test by strain rate control, and a method for controlling the material test machine.

SUMMARY

The first aspect of the present invention relates to a material test machine that executes a material test by applying a test force to a test target to deform the test target, the material test machine including: a detection unit configured to detect a strain amount of the test target; a calculation unit configured to calculate a strain rate of the test target on the basis of a detection result of the detection unit; and a display control unit configured to display a graph showing a change in the strain rate.

The second aspect of the present invention relates to a method for controlling a material test machine that executes a material test by applying a test force to a test target to deform the test target, the method including: a detection step of detecting a strain amount of the test target; a calculation step of calculating a strain rate of the test target on a basis of a detection result of the detection step; and a display control step of displaying a graph showing a change in the strain rate.

DETAILED DESCRIPTION

According to the first aspect of the present invention, since the display control unit displays a graph showing a change in strain rate, the progress of the material test by strain rate control can be easily confirmed.

According to the second aspect of the present invention, since a graph showing a change in strain rate is displayed in the display control step, the progress of the material test by strain rate control can be easily confirmed.

Embodiments of the present invention will be described below with reference to the drawings.

1. Configuration of Tensile Test Machine

Figure 1:
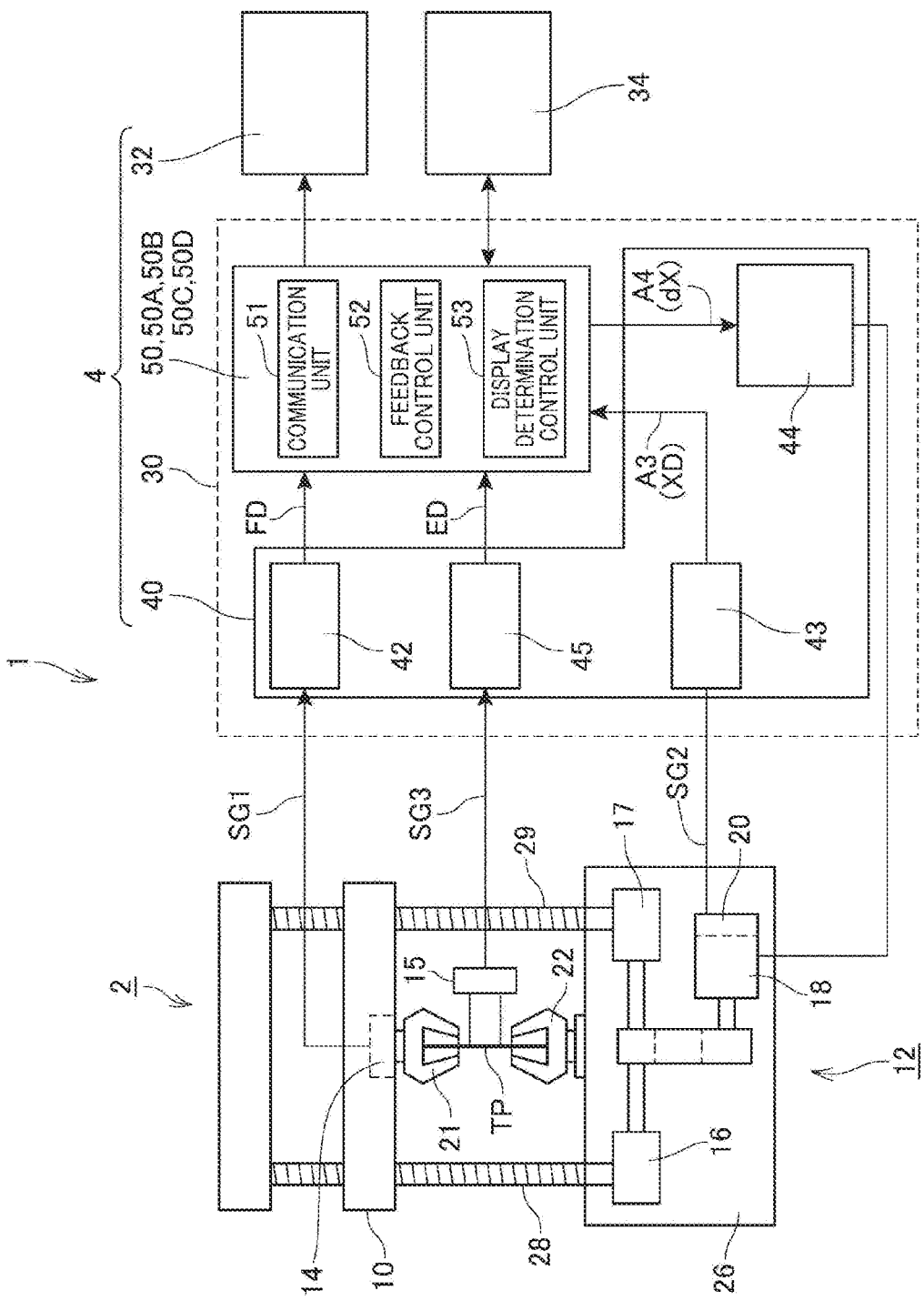
FIG. 1 is a diagram showing an example of a configuration of a tensile test machine according to the present embodiment.

FIG. 1 is a diagram showing an example of a configuration of a tensile test machine 1 according to the present embodiment.

The tensile test machine 1 according to the present embodiment executes a tensile test in which a test force F is applied to a test target TP to deform the test target TP. Specifically, the tensile test machine 1 performs a material test in which the test force F is applied to the test target TP and mechanical properties such as tensile strength, yield point, elongation, and reduction of area of a sample are measured. The test force F is a tensile force.

The tensile test machine 1 includes a test machine body 2 that performs a tensile test by applying the test force F to the test target TP, and a control unit 4 that controls a tensile test operation by the test machine body 2. The test target TP indicates a test piece made of a target material on which the tensile test is executed.

The tensile test machine 1 corresponds to an example of the "material test machine". The tensile test corresponds to an example of the "material test".

In the present embodiment, the "material test machine" is the tensile test machine 1, but the embodiment of the present invention is not limited to this. It is sufficient if the "material test machine" executes a material test in which a test force is applied to a test target to deform the test target. For example, the "material test machine" may be a compression test machine. For example, the "material test machine" may be a bending test machine.

The test machine body 2 includes a table 26, a pair of threaded rods 28 and 29 rotatably erected on the table 26 in a vertical direction, a crosshead 10 movable along these threaded rods 28 and 29, a load mechanism 12 that moves the crosshead 10 to apply a load to the test target TP, and a load cell 14.

The load cell 14 is a sensor that measures the test force F, which is a tensile load applied to the test target TP, and outputs a test force measurement signal SG1.

The load mechanism 12 includes worm reducers 16 and 17 coupled to the lower ends of the threaded rods 28 and 29, a servomotor 18 coupled to the worm reducers 16 and 17, and a rotary encoder 20. The rotary encoder 20 is a sensor that measures the rotation amount of the servomotor 18 and outputs a rotation measurement signal SG2 of the number of pulses corresponding to the rotation amount to the control unit 4.

The load mechanism 12 transmits the rotation of the servomotor 18 to the pair of threaded rods 28 and 29 via the worm reducers 16 and 17, and the threaded rods 28 and 29 rotate synchronously so that the crosshead 10 moves up and down along the threaded rods 28 and 29.

The crosshead 10 is provided with an upper gripping tool 21 for gripping the upper end of the test target TP, and the table 26 is provided with a lower gripping tool 22 for gripping the lower end of the test target TP. At the time of the tensile test, the test machine body 2 raises the crosshead 10 under the control of the control unit 4 in a state where both ends of the test target TP are gripped by the upper gripping tool 21 and the lower gripping tool 22, so as to apply the test force F to the test target TP.

A displacement sensor 15 is arranged on the test target TP. As the test target TP, for example, a dumbbell type test piece formed with a constricted center is used. The displacement sensor 15 is a sensor that measures an elongation amount ED by measuring the distance between a pair of gauge points of the test target TP and outputs an elongation measurement signal SG3. The pair of gauge points are arranged at the top and bottom of the constricted area of the test target TP.

The control unit 4 includes a general control device 30, a display device 32 (display), and a test program execution device 34.

The general control device 30 is a device that centrally controls the test machine body 2, and is connected to the test machine body 2 so as to be able to transmit and receive signals. The signals received from the test machine body 2 include the test force measurement signal SG1 output from the load cell 14, the rotation measurement signal SG2 output from the rotary encoder 20, the elongation measurement signal SG3 output from the displacement sensor 15, and appropriate signals required for control and tests.

The display device 32 is a device that displays various information based on the signals input from the general control device 30, and, for example, the general control device 30 displays, on the display device 32, the elongation amount ED, which is a measurement value of the elongation of the test target TP, on the basis of the elongation measurement signal SG3 during the tensile test. For example, the general control device 30 displays, on the display device 32, displacement amount XD indicating the displacement of the crosshead 10 based on the rotation measurement signal SG2 during the tensile test.

In the tensile test machine 1 according to the present embodiment, the general control device 30 displays, on the display device 32, elongation rate VE during the tensile test. The elongation rate VE indicates the amount of change in the elongation amount ED per unit time.

The tensile test program execution device 34 is a device having a function of accepting user operations such as setting operations or execution instruction operations of various setting parameters such as test conditions of a tensile test and outputting them to the general control device 30, and a function of analyzing data of test force F.

The tensile test program execution device 34 of the present embodiment includes a computer. This computer includes a processor such as a central processing unit (CPU) and a micro-processing unit (MPU), a memory device such as a read only memory (ROM) and a random access memory (RAM), a storage device such as a hard disk drive (HDD) and a solid state drive (SSD), and an interface circuit for connecting the general control device 30 and various peripheral devices. The processor executes a tensile test program, which is a computer program stored in the memory device or the storage device, to realize the various functions described above.

Next, the general control device 30 of the present embodiment will be described in more detail. The general control device 30 includes a signal input/output unit 40 and a control circuit unit 50.

The signal input/output unit 40 constitutes an input/output interface circuit for transmitting and receiving signals to and from the test machine body 2. In the present embodiment, the signal input/output unit 40 includes a first sensor amplifier 42, a second sensor amplifier 45, a counter circuit 43, and a servo amplifier 44.

The first sensor amplifier 42 is an amplifier that amplifies the test force measurement signal SG1 output from the load cell 14 and outputs it to the control circuit unit 50. The second sensor amplifier 45 is an amplifier that amplifies the elongation measurement signal SG3 output from the displacement sensor 15 and outputs it to the control circuit unit 50.

The counter circuit 43 counts the number of pulses of the rotation measurement signal SG2 output from the rotary encoder 20, and outputs a displacement measurement signal A3 indicating the displacement amount XD of the crosshead 10 that moves up and down as a result of the rotation amount of the servomotor 18, i.e., the rotation of the servomotor 18, to the control circuit unit 50 as a digital signal. The servo amplifier 44 is a device that controls the servomotor 18 under the control of the control circuit unit 50.

The control circuit unit 50 is a unit that instructs the test machine body 2 to execute a tensile test, and includes a communication unit 51 (receiver/transmitter), a feedback control unit 52, and a display determination control unit 53.

The control circuit unit 50 includes a computer including a processor 50A such as a CPU and an MPU, a memory device 50B such as a ROM and a RAM, a storage device 50C such as an HDD and an SSD, an interface circuit for the signal input/output unit 40, a communication device 50D that communicates with the tensile test program execution device 34, a display control circuit that controls the display device 32, and various electronic circuits. The processor 50A of the control circuit unit 50 executes a control program stored in the memory device 50B or the storage device 50C to realize each functional unit of the display determination control unit 53 shown in FIG. 2.

An A/D converter is provided in the interface circuit of the signal input/output unit 40, and the test force measurement signal SG1 and the elongation measurement signal SG3, which are analog signals, are converted into digital signals by the A/D converter.

The control circuit unit 50 is not limited to a computer, and may be configured by one or a plurality of appropriate circuits such as an integrated circuit, e.g., an IC chip or an LSI.

The communication unit 51 communicates with the test program execution device 34, and receives test condition settings, setting values of various setting parameters, tensile test execution instructions, interruption instructions, and the like from the test program execution device 34. The communication unit 51 transmits the elongation amount ED based on the elongation measurement signal SG3 and the test force FD based on the test force measurement signal SG1 to the test program execution device 34 at an appropriate timing. The communication unit 51 transmits the displacement amount XD based on the rotation measurement signal SG2 to the test program execution device 34 at an appropriate timing.

The feedback control unit 52 feedback controls the servomotor 18 of the test machine body 2 to execute the tensile test. The feedback control unit 52 is a circuit that executes feedback control of the servomotor 18.

In the present embodiment, the feedback control unit 52 executes rate control. Specifically, the feedback control unit 52 executes rate control for, for example, the elongation amount ED output from the displacement sensor 15. Specifically, the feedback control unit 52 calculates a command value dX of the displacement amount XD so that the elongation rate VE matches an elongation rate target value VT, and outputs a command signal A4 indicating the command value dX to the servo amplifier 44. In other words, the feedback control unit 52 executes constant elongation rate control. The elongation rate target value VT indicates a target value of the elongation rate VE. The elongation rate VE indicates the amount of change in the elongation amount ED per unit time.

When the test target TP starts plastic deformation, the feedback control unit 52 executes constant test force control. In the constant test force control, the feedback control unit 52 calculates the command value dX of the displacement amount XD so that the test force F becomes a constant value, and outputs the command signal A4 indicating the command value dX to the servo amplifier 44.

In the present embodiment, "rate control" means controlling the amount of change of a detection value measured by a sensor or the like per unit time so as to match the target value. The constant elongation rate control corresponds to an example of the rate control.

The "position control" means controlling a detection value measured by a sensor or the like so as to match the target value. The constant test force control corresponds to an example of the position control.

2. Configuration of Display Determination Control Unit

Figure 2:
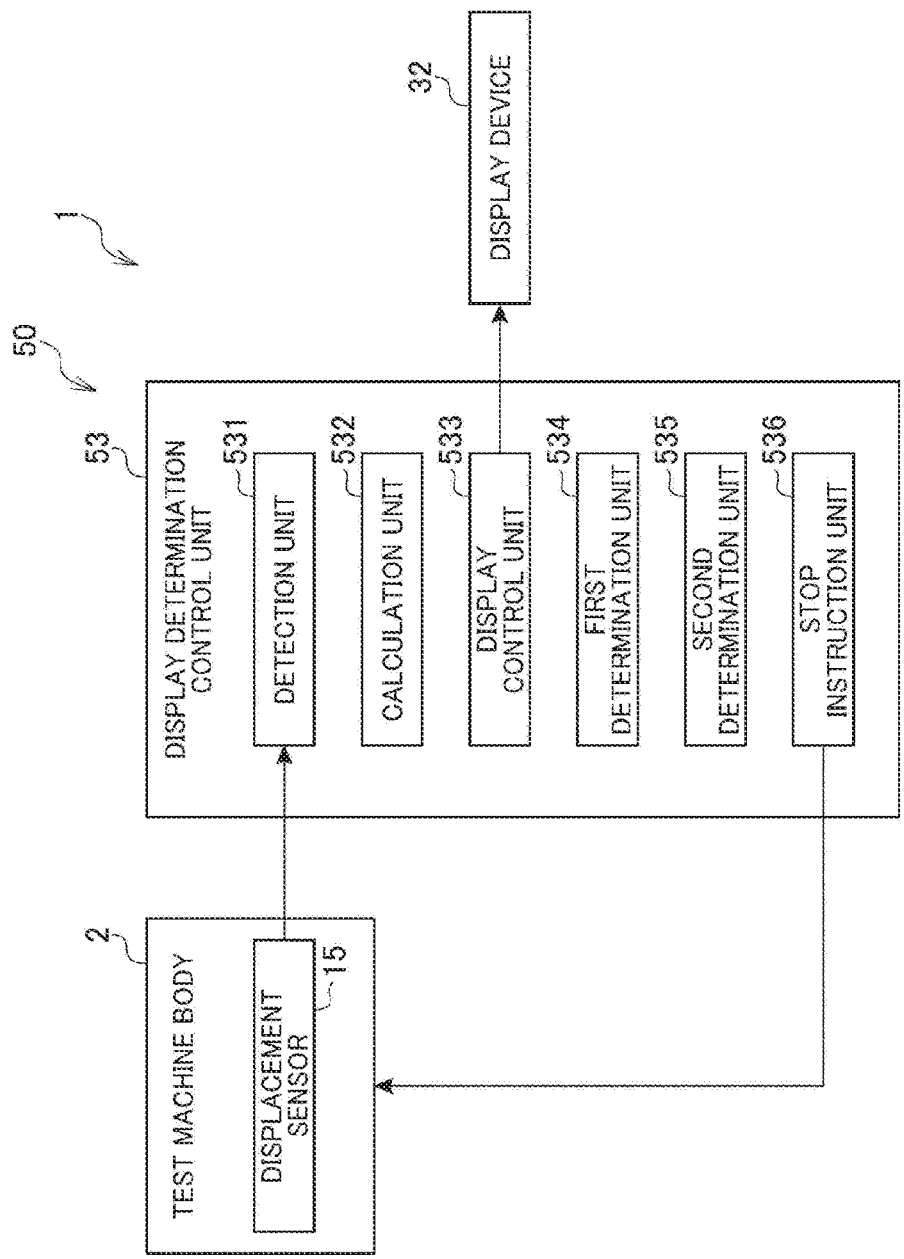
FIG. 2 is a diagram showing an example of a configuration of a display determination control unit.

FIG. 2 is a diagram showing an example of a configuration of the display determination control unit 53.

As shown in FIG. 2, the display determination control unit 53 includes a detection unit 531, a calculation unit 532, a display control unit 533, a first determination unit 534, a second determination unit 535, and a stop instruction unit 536. Specifically, the processor 50A of the control circuit unit 50 executes the control program stored in the memory device 50B or the storage device 50C to function as the detection unit 531, the calculation unit 532, the display control unit 533, the first determination unit 534, the second determination unit 535, and the stop instruction unit 536.

The detection unit 531 detects the elongation amount ED of the test target TP. Specifically, the detection unit 531 detects the elongation amount ED of the test target TP every predetermined time $\Delta T$ by acquiring, via the second sensor amplifier 45, the elongation measurement signal SG3 output from the displacement sensor 15. The predetermined time $\Delta T$ is, for example, 0.5 seconds.

The elongation amount ED corresponds to an example of the "strain amount".

The calculation unit 532 calculates the elongation rate VE of the test target TP based on the detection result of the detection unit 531. The elongation rate VE indicates the amount of change in the elongation amount ED per unit time.

Specifically, as shown in the following formula (1), the calculation unit 532 calculates the elongation rate VE by dividing the difference between a first elongation amount ED1 detected by the detection unit 531 and a second elongation amount ED2 detected by the detection unit 531 following the first elongation amount ED1 by the predetermined time $\Delta T$.

$$VE=(ED2-ED1)/\Delta T \quad (1)$$

The first elongation amount ED1 corresponds to an example of the "first strain amount", the second elongation amount ED2 corresponds to an example of the "second strain amount", and the elongation rate VE corresponds to an example of the "strain rate".

The display control unit 533 displays a graph showing changes in the elongation rate VE. For example, the display control unit 533 displays, on the display device 32, a graph G1 showing changes in the elongation rate VE with respect to the elongation amount ED. The display control unit 533 updates the graph G1 every time the calculation unit 532 calculates the elongation rate VE. In other words, the display control unit 533 updates the graph G1 every predetermined time $\Delta T$. The graph G1 will be described in detail with reference to FIG. 3.

In the present embodiment, the display control unit 533 displays the graph G1 showing changes in the elongation rate VE with respect to the elongation amount ED, but the embodiment of the present invention is not limited to this. For example, the display control unit 533 may display a graph showing changes in the elongation rate VE with respect to time. In this case, for example, the horizontal axis of the graph indicates time, and the vertical axis of the graph indicates the elongation rate VE.

The first determination unit 534 determines whether the elongation rate VE is within a predetermined range within the range in which the test target TP undergoes elastic deformation. Specifically, when the elongation rate VE satisfies the following formula (2), the first determination unit 534 determines that the elongation rate VE is within the predetermined range.

$$VE1 \leq VE \leq VE2 \quad (2)$$

A first elongation rate VE1 indicates the lower limit value of the predetermined range, and a second elongation rate VE2 indicates the upper limit value of the predetermined range. The first elongation rate VE1 is defined by, for example, the following formula (3), and the second elongation rate VE2 is defined by the following formula (4).

$$VE1=VT\times(1-\alpha) \quad (3)$$

$$VE2=VT\times(1+\alpha) \quad (4)$$

The elongation rate target value VT indicates a target value of the elongation rate VE. A coefficient $\alpha$ corresponds to the control accuracy of the elongation rate VE. The coefficient $\alpha$ is, for example, 10%, that is, 0.1. The feedback control unit 52 controls the displacement amount XD so that the elongation rate VE matches the elongation rate target value VT.

In the present embodiment, the "range in which the test target TP undergoes elastic deformation" indicates a range in which the elongation amount ED ranges from a third elongation amount ED3 to a fourth elongation amount ED4. In the following description, the "range in which the test target TP undergoes elastic deformation" may be described as the range RG.

The third elongation amount ED3 indicates an elongation amount ED increased by a predetermined elongation amount ΔED1 after the tensile test is started and the elongation rate VE reaches the elongation rate target value VT. The third elongation amount ED3 is expressed by, for example, the following formula (5).

$$ED3=EDT+\Delta ED1 \quad (5)$$

However, the elongation amount EDT indicates an elongation amount ED when the elongation rate target value VT is reached.

The predetermined elongation amount ΔED1 is set in advance according to the material and size of the test target TP.

The fourth elongation amount ED4 indicates an elongation amount ED in which the elongation amount ED is smaller than an elongation amount EDB by a predetermined elongation amount ΔED2. The elongation amount EDB indicates an elongation amount ED when the test target TP changes from elastic deformation to plastic deformation.

The fourth elongation amount ED4 is expressed by, for example, the following formula (6).

$$ED4=EDB-\Delta ED2 \quad (6)$$

The predetermined elongation amount ΔED2 is set in advance according to the material and size of the test target TP.

Each of the third elongation amount ED3 and the fourth elongation amount ED4 will be specifically described with reference to FIG. 3.

The second determination unit 535 determines pass/fail of the result of the tensile test based on the determination result of the first determination unit 534. Specifically, when the first determination unit 534 determines that the elongation rate VE is within the predetermined range within the range in which the test target TP undergoes elastic deformation, the second determination unit 535 determines that the result of the tensile test is pass.

In the present embodiment, "pass/fail of the result of the tensile test" indicates whether or not the tensile test has been executed without any problems. Specifically, when the elongation rate VE is within the predetermined range within the range in which the test target TP undergoes elastic deformation, the second determination unit 535 determines that the result of the tensile test is pass. When the elongation rate VE is not within the predetermined range within the range in which the test target TP undergoes elastic deformation, the second determination unit 535 determines that the result of the tensile test is fail.

The stop instruction unit 536 stops the execution of the tensile test when the second determination unit 535 determines that the result of the tensile test is fail. Specifically, the stop instruction unit 536 instructs the test machine body 2 to stop the execution of the tensile test when the second determination unit 535 determines that the result of the tensile test is fail. The test machine body 2 stops the execution of the tensile test according to the instruction of the stop instruction unit 536.

3. Configuration of Elongation Rate Display Screen

Figure 3:
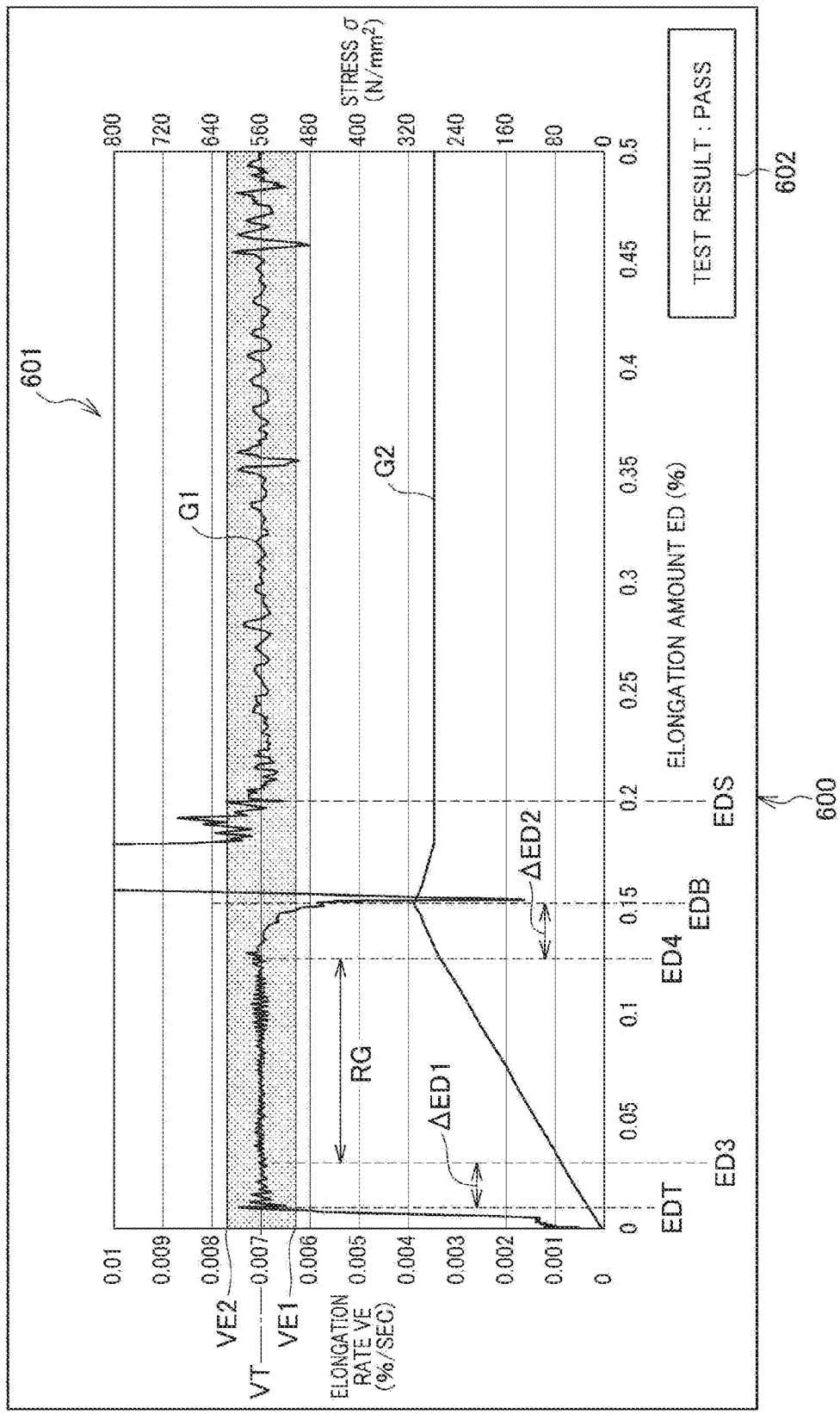
FIG. 3 is a screen view showing an example of an elongation rate display screen displayed on a display device.

FIG. 3 is a screen view showing an example of an elongation rate display screen 600 displayed on the display device 32. The elongation rate display screen 600 is displayed on the display device 32 by the display control unit 533.

As shown in FIG. 3, the elongation rate display screen 600 includes a graph display unit 601 and a result display unit 602.

The graph display unit 601 displays a graph G1 showing the relationship between the elongation rate VE and the elongation amount ED and the graph G2 showing the relationship between a stress 6 and the elongation amount ED. In the graph display unit 601, the vertical axis on the left side indicates the elongation rate VE, the vertical axis on the right side indicates the stress 6, and the horizontal axis indicates the elongation amount ED. The stress 6 is calculated by the following formula (7).

$$\sigma=FD/CS \quad (7)$$

A cross-sectional area CS indicates the cross-sectional area before the test target TP is deformed at a central portion between the pair of gauge points of the test target TP.

As shown in the graph G1, when the tensile test is started and the test force F is applied to the test target TP, the test target TP starts elastic deformation. Then, each of the elongation amount ED and the elongation rate VE increases. Then, when the elongation amount ED reaches the elongation amount EDT, the elongation rate VE reaches the elongation rate target value VT. Thereafter, the elongation amount ED increases by the predetermined elongation amount ΔED1 from the elongation amount EDT, and the elongation amount ED reaches the third elongation amount ED3. The predetermined elongation amount ΔED1 is, for example, 0.02(%).

In FIG. 3, the elongation rate target value VT is 0.007 (%/see). That is, while the test target TP undergoes elastic deformation, the feedback control unit 52 executes the constant elongation rate control so that the elongation rate VE becomes 0.007 (%/see).

The first elongation rate VE1 is 0.0063 (%/see), and the second elongation rate VE2 is 0.0077 (%/see). When the elongation rate VE satisfies the above formula (2) defined by the first elongation rate VE1 and the second elongation rate VE2, the first determination unit 534 determines that the elongation rate VE is within the predetermined range.

Then, after the elongation amount ED reaches the fourth elongation amount ED4, the test target TP starts plastic deformation at the elongation amount EDB in which the elongation amount is increased by the predetermined elongation amount ΔED2.

The predetermined elongation amount ΔED2 is, for example, 0.03(%).

The elongation rate VE changes significantly before and after the elongation amount EDB at which plastic deformation is started. The range of the elongation amount ED from the third elongation amount ED3 to the fourth elongation amount ED4 corresponds to an example of the range RG.

Then, when the elongation amount ED becomes equal to or more than the elongation amount EDS, the fluctuation of the elongation rate VE converges. The elongation amount EDS indicates the lower limit value of the elongation amount ED at which the fluctuation of the elongation rate VE after the start of plastic deformation of the test target TP converges.

As shown in the graph G1, in the range RG from the third elongation amount ED3 to the fourth elongation amount ED4, the elongation rate VE is in the range of the first elongation rate VE1 or more and the second elongation rate VE2 or less. Therefore, the first determination unit 534 determines that the elongation rate VE is within the predetermined range in the range RG in which the test target TP undergoes elastic deformation.

The result display unit 602 displays the determination result of pass/fail of the result of the tensile test by the second determination unit 535. Since the first determination unit 534 determines that the elongation rate VE is within the predetermined range in the range RG in which the test target TP undergoes elastic deformation, the second determination unit 535 determines that the result of the tensile test is pass.

The result display unit 602 displays "test result: pass".

As shown in the graph G2, when the tensile test is started and the test force F is applied to the test target TP, the test target TP starts elastic deformation. Then, each of the elongation amount ED and the stress 6 increases. In the region where the test target TP undergoes elastic deformation until the elongation amount ED reaches the elongation amount EDB, the stress 6 increases substantially in proportion to the elongation amount ED. Then, when the test target TP starts plastic deformation, the stress a decreases, and when the elongation amount ED becomes equal to or more than the elongation amount EDS, the stress a becomes a substantially constant value. When the stress 6 is a substantially constant value, the stress 6 is approximately 280 N/mm. In other words, the feedback control unit 52 executes the constant test force control so that the stress a becomes 280 N/mm.

4. Processing of Display Determination Control Unit

Figure 4:
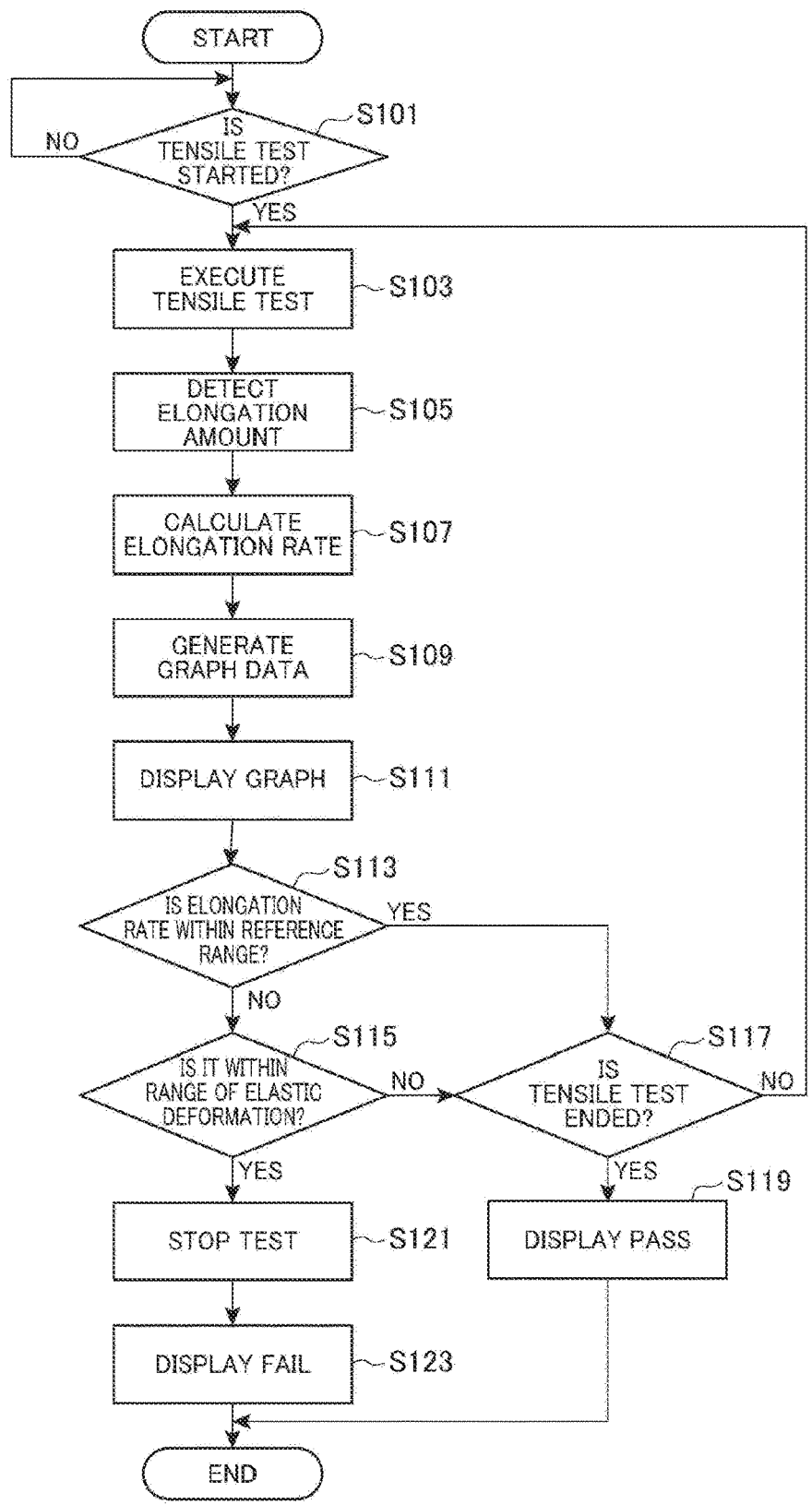
FIG. 4 is a flowchart showing an example of processing of the display determination control unit.

FIG. 4 is a flowchart showing an example of processing of the display determination control unit 53.

First, in step S101, the display determination control unit 53 determines whether the test machine body 2 has started the tensile test.

When the display determination control unit 53 determines that the test machine body 2 has not started the tensile test (step S101; NO), the processing is in a standby state. When the display determination control unit 53 determines that the test machine body 2 has started the tensile test (step S101; YES), the processing proceeds to step S103.

Then, in step S103, the test machine body 2 executes the tensile test.

Next, in step S105, the detection unit 531 detects the elongation amount ED of the test target TP.

Next, in step S107, the calculation unit 532 calculates the elongation rate VE of the test target TP based on the detection result of the detection unit 531.

Next, in step S109, the display control unit 533 generates graph data corresponding to the graph G1 showing changes in the elongation rate VE with respect to the elongation amount ED.

Next, in step S111, the display control unit 533 displays, on the display device 32, the graph G1 showing changes in the elongation rate VE with respect to the elongation amount ED.

Next, in step S113, the first determination unit 534 determines whether the elongation rate VE is within the predetermined range.

When the first determination unit 534 determines that the elongation rate VE is not within the predetermined range (step S113; NO), the processing proceeds to step S115.

Then, in step S115, the first determination unit 534 determines whether it is within the range RG in which the test target TP undergoes elastic deformation. Specifically, the range RG indicates the range in which the elongation amount ED ranges from the third elongation amount ED3 to the fourth elongation amount ED4.

When the first determination unit 534 determines that it is not within the range RG in which the test target TP undergoes elastic deformation (step S115; NO), the processing proceeds to step S117. When the first determination unit 534 determines that it is within the range RG in which the test target TP undergoes elastic deformation (step S115; YES), the processing proceeds to step S121.

Then, in step S121, the second determination unit 535 determines that the result of the tensile test is fail and the stop instruction unit 536 stops the execution of the tensile test.

Next, in step S123, the display determination control unit 53 displays on the display device 32 that the result of the tensile test is fail, and then the processing ends.

When the first determination unit 534 determines that the elongation rate VE is within the predetermined range (step S113; YES), the processing proceeds to step S117.

Then, in step S117, the display determination control unit 53 determines whether the tensile test has ended.

When the display determination control unit 53 determines that the tensile test has not ended (step S117; NO), the processing returns to step S103. When the display determination control unit 53 determines that the tensile test has ended (step S117; YES), the processing proceeds to step S119.

Then, in step S119, the second determination unit 535 determines that the result of the tensile test is pass and displays on the display device 32 that the result of the tensile test is pass. Thereafter, the processing ends.

Step S105 corresponds to an example of the "detection step". Step S107 corresponds to an example of the "calculation step". Step S111 corresponds to an example of the "display control step".

5. Aspects and Effects

It will be appreciated by those skilled in the art that the above-described embodiment and variation are specific examples of the following aspects.

Item 1

The material test machine related to one aspect is a material test machine that executes a material test by applying a test force to a test target to deform the test target, the material test machine including: a detection unit configured to detect a strain amount of the test target; a calculation unit configured to calculate a strain rate of the test target on the basis of a detection result of the detection unit; and a display control unit configured to display a graph showing a change in the strain rate.

With the material test machine according to item 1, since the display control unit displays a graph showing a change in the strain rate, the user can easily confirm the progress of the material test by strain rate control.

Item 2

The material test machine according to item 1, in which the display control unit updates the graph every time the calculation unit calculates the strain rate.

With the material test machine according to item 2, since the display control unit updates the graph every time the calculation unit calculates the strain rate, the graph is updated according to the progress of the test. Therefore, the progress of the material test by strain rate control can be easily confirmed.

Item 3

The material test machine according to item 1 or 2, in which the graph shows a change in the strain rate with respect to the strain amount.

With the material test machine according to item 3, since the graph showing a change in the strain rate with respect to the strain amount is displayed, the progress of the material test by the strain rate control can be easily confirmed.

Item 4

The material test machine according to item 1 or 2, in which the graph shows a change in the strain rate with respect to time.

With the material test machine according to item 4, since the graph showing a change in the strain rate with respect to time is displayed, the progress of the material test by the strain rate control can be easily confirmed.

Item 5

The material test machine according to any one of items 1 to 4, in which the detection unit detects the strain amount of the test target every predetermined time, and the calculation unit calculates the strain rate by dividing a difference between a first strain amount detected by the detection unit and a second strain amount detected by the detection unit following the first strain amount by the predetermined time.

With the material test machine according to item 5, since the strain rate is calculated by dividing the difference between the first strain amount and the second strain amount detected following the first strain amount by the predetermined time, the strain rate can be calculated by simple processing.

Item 6

The material test machine according to any one of items 1 to 5, including: a first determination unit configured to determine whether the strain rate is within a predetermined range; and a second determination unit configured to determine pass/fail of a result of the material test on a basis of a determination result of the first determination unit.

With the material test machine according to item 6, since the first determination unit determines whether the strain rate is within the predetermined range and the second determination unit determines, based on the determination result of the first determination unit, pass/fail of a result of a material test, it is possible to reduce the load of the work for the worker to determine the pass/fail of the result of the material test.

Item 7

The material test machine according to item 6, in which the material test includes a tensile test, and the first determination unit determines whether the strain rate is within the predetermined range within a range in which the test target undergoes elastic deformation.

With the material test machine according to item 7, since in the tensile test it is determined whether the strain rate is within the predetermined range in the range where the test target undergoes elastic deformation, it is possible to properly determine the pass/fail of the test result in the tensile test. The load of the work for the worker to determine the pass/fail of the result of the tensile test can be reduced.

Item 8

The material test machine according to item 6 or 7, including: a stop unit configured to stop execution of the material test when the second determination unit determines that the result of the material test is fail.

With the material test machine according to item 8, since the execution of the material test is stopped by the stop unit when the result of the material test is determined to be fail, the consumption amount of the test target can be reduced.

That is, conventionally, since the pass/fail of the result of the material test has been determined by the worker after the test is completed, the test target undergoes plastic deformation and the test target cannot be reused even in the case of fail. With the material test machine according to item 8, when the test target is determined to be fail during elastic deformation, the test target can be reused, and the consumption amount of the test target can be reduced.

Item 9

The method for controlling the material test machine related to another aspect is a method for controlling a material test machine that executes a material test by applying a test force to a test target to deform the test target, the method including: a detection step of detecting a strain amount of the test target; a calculation step of calculating a strain rate of the test target on a basis of a detection result of the detection step; and a display control step of displaying a graph showing a change in the strain rate.

With the method for controlling the material test machine according to item 9, since a graph showing a change in the strain rate is displayed in the display control step, the user can easily confirm the progress of the material test by strain rate control.

6. Other Embodiments

The above-described embodiment is merely an example of one aspect of the present invention, and can be arbitrarily modified and applied without departing from the spirit of the present invention.

In the above-described embodiment, the case where the material test machine is the tensile test machine 1 has been described, but the embodiment of the present invention is not limited to this. It is sufficient if the material test machine performs a material test in which a test force is applied to the test target TP to deform the test target TP. For example, the material test machine may be a compression test machine or a bending test machine.

In the above-described embodiment, the display control unit 533 displays the graph G1 showing changes in the elongation rate VE with respect to the elongation amount ED, but the embodiment of the present invention is not limited to this. For example, the display control unit 533 may display a graph showing changes in the elongation rate VE with respect to time. In this case, for example, the horizontal axis of the graph indicates time, and the vertical axis of the graph indicates the elongation rate VE.

In the above-described embodiment, the feedback control unit 52 executes the constant elongation rate control, but the embodiment of the present invention is not limited to this.

For example, the feedback control unit 52 may execute constant test force rate control. In this case, the display control unit 533 may display a graph showing changes in the test force rate with respect to time. The test force rate indicates changes in the test force F per unit time. For example, the feedback control unit 52 may execute constant displacement rate control. In this case, the display control unit 533 may display a graph showing changes in the displacement rate with respect to time. The displacement rate indicates changes in the displacement amount XD per unit time.

In the above-described embodiment, the "range in which the test target TP undergoes elastic deformation" indicates a range in which the elongation amount ED ranges from the third elongation amount ED3 to the fourth elongation amount ED4, but the embodiment of the present invention is not limited to this. It is sufficient if the "range in which the test target TP undergoes elastic deformation" is within the period during which the test target TP undergoes elastic deformation. For example, each of the third elongation amount ED3 and the fourth elongation amount ED4 may be set by the worker or the like.

In the above-described embodiment, the display determination control unit 53 of the control circuit unit 50 includes the detection unit 531, the calculation unit 532, the display control unit 533, the first determination unit 534, the second determination unit 535, and the stop instruction unit 536, but the embodiment of the present invention is not limited to this. It is sufficient if a computer communicatively connected to the test machine body 2 includes the detection unit 531, the calculation unit 532, the display control unit 533, the first determination unit 534, the second determination unit 535, and the stop instruction unit 536. For example, the tensile test machine 1 may include a personal computer communicatively connected to the test machine body 2, and the personal computer may include the detection unit 531, the calculation unit 532, the display control unit 533, the first determination unit 534, the second determination unit 535, and the stop instruction unit 536. The computer may be a tablet terminal or a smartphone.

In the above-described embodiment, the functional blocks shown in FIG. 2 are a schematic diagram showing the components classified according to the main processing contents for the sake of easy understanding of the present invention, and the components can be further classified into more components according to the processing contents. The components can be classified so that one component executes more processing.

In the above-described embodiment, the unit of processing of the flowchart shown in FIG. 4 is divided according to the main processing contents for the sake of easy understanding of the processing of the display determination control unit 53. It is not limited by the method of division or names of the units of processing shown in the flowchart of FIG. 4, and can be divided into more units of processing or can be divided so that one unit of processing includes more processing according to the processing contents. The order of processing of the above flowchart is not limited to the illustrated example.

What is claimed is:

1. A material test machine that executes a material test by applying a test force to a test target to deform the test target, the material test machine comprising:
a detection unit configured to detect a strain amount of the test target;
a calculation unit configured to calculate a strain rate of the test target on a basis of a detection result of the detection unit; and
a display control unit configured to display a graph showing a change in the strain rate,
the display control unit updates the graph every time the calculation unit calculates the strain rate,
a first determination unit configured to determine whether the strain rate is within a predetermined range; and
a second determination unit configured to determine pass/fail of a result of the material test on a basis of a determination result of the first determination unit.

2. The material test machine according to claim 1, wherein the graph shows a change in the strain rate with respect to the strain amount.

3. The material test machine according to claim 1, wherein the graph shows a change in the strain rate with respect to time.

4. The material test machine according to claim 1, wherein
the detection unit detects the strain amount of the test target every predetermined time, and
the calculation unit calculates the strain rate by dividing a difference between a first strain amount detected by the detection unit and a second strain amount detected by the detection unit following the first strain amount by the predetermined time.

5. The material test machine according to claim 1, wherein
the material test includes a tensile test, and
the first determination unit determines whether the strain rate is within the predetermined range within a range in which the test target undergoes elastic deformation.

6. The material test machine according to claim 1, comprising: a stop unit configured to stop execution of the material test when the second determination unit determines that the result of the material test is fail.

7. The material test machine according to claim 1, wherein the display control unit displays an upper limit and a lower limit showing pass/fail of the strain in the graph showing the change in the strain rate.

8. A method for controlling a material test machine that executes a material test by applying a test force to a test target to deform the test target, the method comprising:
a detection step of detecting a strain amount of the test target;
a calculation step of calculating a strain rate of the test target on a basis of a detection result of the detection step; and
a display control step of displaying a graph showing a change in the strain rate,
the display control step updates the graph every time the calculation step calculates the strain rate,
a first determination step of determining by a first determination unit whether the strain rate is within a predetermined range; and
a second determination step of determining by a second determination unit pass/fail of a result of the material test on a basis of a determination result of the first determination unit.

* * * * *